United States Patent
Hsieh (10) Patent No.: US 8,505,820 B2
(45) Date of Patent: Aug. 13, 2013

(54) CARD READING DEVICE FOR TRANSACTION SYSTEM

(75) Inventor: Jason Hsieh, Taipei Hsien (TW)

(73) Assignee: Uniform Industrial Corp., Taipei Hsien (TW)

( * ) Notice: Subject to any disclaimer, the term of this patent is extended or adjusted under 35 U.S.C. 154(b) by 289 days.

(21) Appl. No.: 12/951,917

(22) Filed: Nov. 22, 2010

(65) Prior Publication Data

US 2011/0068171 A1    Mar. 24, 2011

Related U.S. Application Data

(63) Continuation-in-part of application No. 12/500,021, filed on Jul. 9, 2009, now abandoned.

(30) Foreign Application Priority Data

Jul. 10, 2008  (TW) .............................. 97212282 U (51) Int. Cl.
- *G06K 7/00* (2006.01)
- *G06K 7/08* (2006.01)
- *G06Q 20/00* (2012.01)
- *G08B 13/14* (2006.01)

(52) U.S. Cl.
USPC ........... 235/449; 235/380; 235/440; 235/451; 705/16; 705/17; 340/10.1; 340/572.1

(58) Field of Classification Search
USPC ............. 235/380, 440, 449, 451; 705/16–17; 340/10.1, 571.1
See application file for complete search history.

(56) References Cited

U.S. PATENT DOCUMENTS

| | | | |
|---|---|---|---|
| 7,051,932 B2 * | 5/2006 | Fernandes et al. | 235/449 |
| 2005/0205659 A1 | 9/2005 | Murayama et al. | |
| 2006/0022046 A1 | 2/2006 | Iwamura | |
| 2006/0226224 A1 * | 10/2006 | Henry | 235/449 |

* cited by examiner

*Primary Examiner* — Michael G Lee
*Assistant Examiner* — Laura Gudorf
(74) *Attorney, Agent, or Firm* — Muncy, Geissler, Olds & Lowe, PLLC (57) ABSTRACT

A non-magnetic card reader, a magnetic card reader and a card transaction method are provided to selectively read a magnetic card and a non-magnetic card for identification of payment transaction at a transaction terminal. The non-magnetic card reader includes an integrator module electrically connecting to the magnetic card reader and the transaction terminal. Each of the non-magnetic card reader, the magnetic card reader and the transaction terminal has one or more physical connectors compatible with a magnetic-card communication protocol. A non-magnetic card signal incorporated with card data of the non-magnetic card is converted by the integrator module to match the magnetic-card communication protocol and is selectively transmitted to a main controller of the transaction terminal for identification. A magnetic card signal from the magnetic card reader incorporated with card data of the magnetic card is selectively transceived through the integrator module to the main controller for identification.

13 Claims, 9 Drawing Sheets

CARD READING DEVICE FOR TRANSACTION SYSTEM

CROSS-REFERENCES TO RELATED APPLICATIONS

This non-provisional application is a continuation-in-part application of U.S. Ser. No. 12/500,021, filed on Jul. 9, 2009, now abandoned the entire contents of which are hereby incorporated by reference.

FIELD OF THE INVENTION

The present invention relates to a card reading device for a transaction system, and more particularly to a card reading device of a transaction system combined with non-contact data transmission.

BACKGROUND

Accompanying the progress of technology and the change of business modes, the use of plastic money such as credit card as a method of payment is becoming more popular. A card holder does not have to carry cash with them, facilitating the convenience of consumer transactions. Plastic money therefore replaces cash transactions, and becomes the main stream business transaction method.

Figure 1:
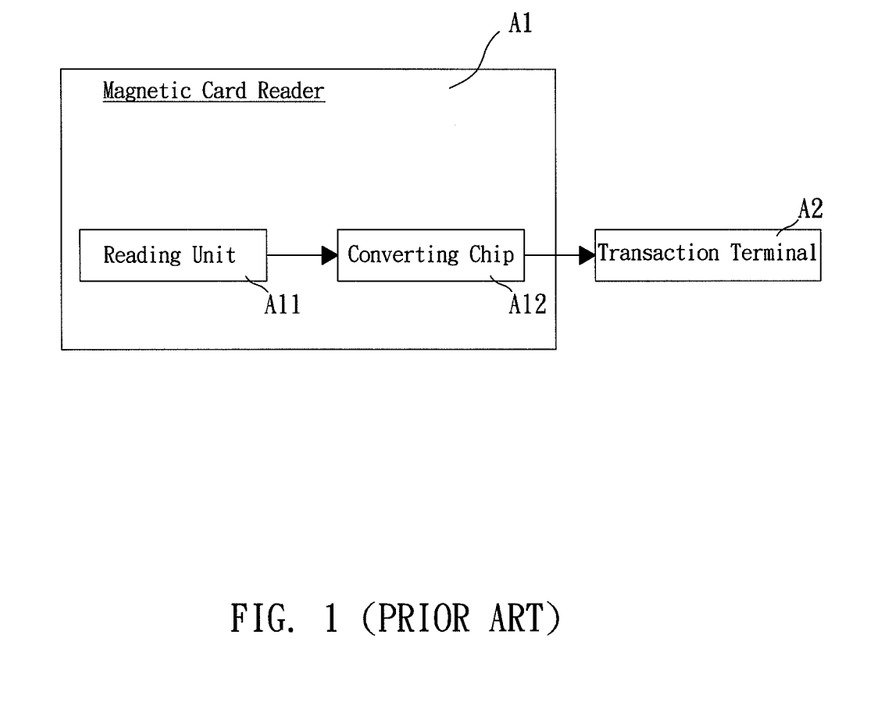
FIG. 1 is a schematic view of a conventional credit card paying mechanism.

The conventional card paying mechanism is shown in FIG. 1. A reading unit A11 in a magnetic card reader A1 is used to read data in a card holder's credit card, and the analog data is converted to digital data through an analog/digital converting chip A12 in the magnetic card reader A1. Finally, the digital data is transmitted to a transaction terminal A2, and this transaction can then be confirmed after the data in the credit card is verified.

Figure 8:
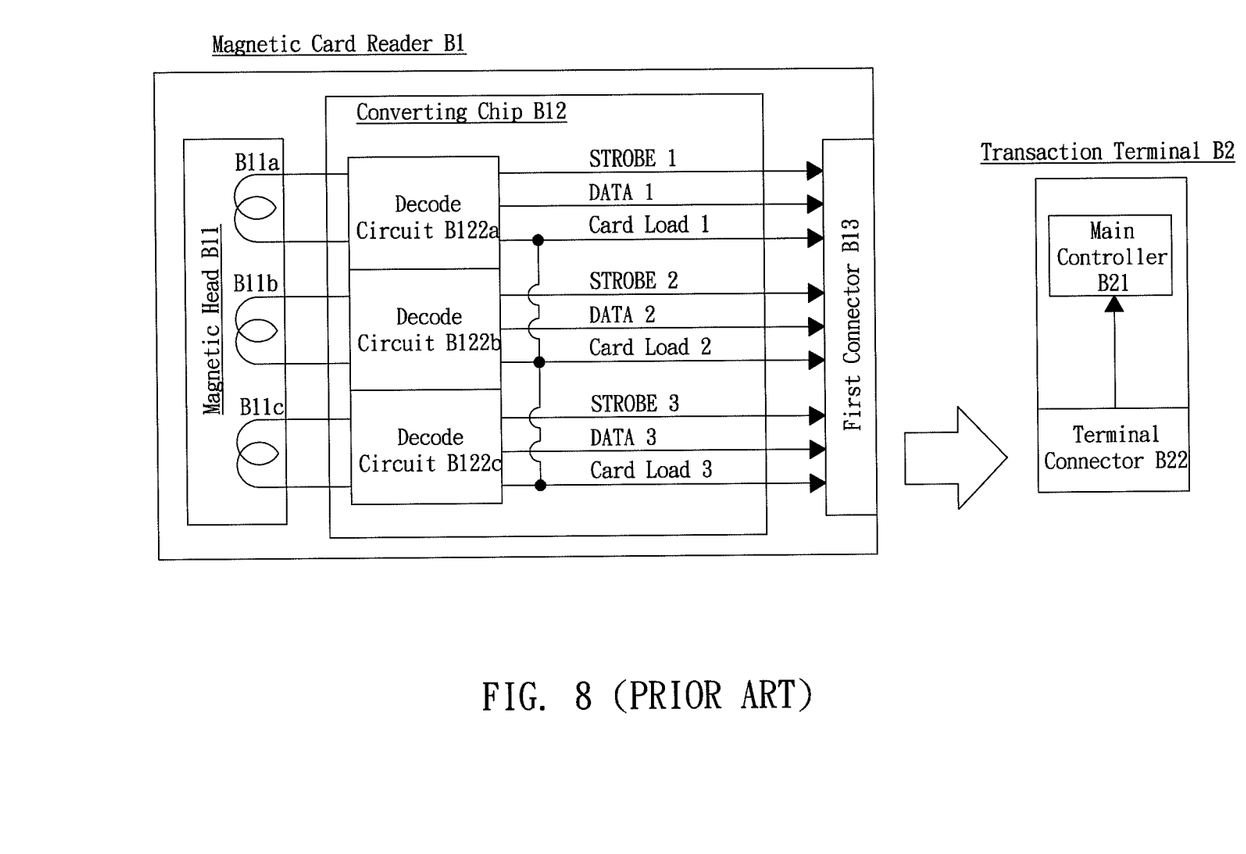
FIG. 8 is a detailed block diagram for a conventional magnetic card and a conventional transaction terminal.

Detailed block diagrams for a conventional magnetic card and a conventional transaction terminal are shown in FIG. 8. When a magnetic head B11 of a magnetic card reader B1 reads a magnetic card signal from sensing units B11a/B11b/B11c of a magnetic head B11, decode circuits B122a/B122b/B122c of a converting chip B12 start to decode the magnetic card signal and the decoded (0, 1) data will be transmitted through STROBE signal lines (STROBE1, 2, 3) and DATA signal lines (DATA1, 2 &3). Each pulse on the STROBE signal lines indicates an effective bit data transmitted on the DATA signal lines. Three signal lines Card Load 1, Card Load 2 and Card Load 3 are connected to an AND gate (wired-AND). As long as any of the signal lines Card Load 1, Card Load 2 and Card Load 3 has a signal transmitted thereon, the whole set of wired-AND signal lines Card Load 1, Card Load 2 and Card Load 3 are activated to notice a main controller B21 of the transaction terminal B2 through a first connector B13 and a terminal connector B22 of the transaction terminal B2, that a magnetic card signal is coming in. Note that the first connector B13 of the magnetic card reader B1 and the terminal connector B22 of the transaction terminal B2 are compatible in signal transmission. Also the decoded magnetic card signals are only sent through the terminal connector B22 to the main controller B12 in an "unidirectional" manner. Afterwards, the main controller B21 starts to receive the magnetic card information transmitted via the magnetic card signals. However, there are some shortcomings regarding the conventional transaction mechanism mentioned above. (1) The signals transmitted through the STROBE and Data signal lines of the converting chip B12 are all output only (unidirectional); namely, bidirectional communications between the magnetic card reader B1 and the main controller B21 of the transaction terminal B2 are not allowed. (2) As soon as the main controller B21 of the transaction terminal B2 detects that a signal on the Card Load signal lines is activated, the main controller B21 must be ready immediately to receive the coming magnetic card information. If in any circumstances the main controller B21 of the transaction terminal B2 misses any pulse sent on the STROBE signal line, that means there is a bit data on the DATA signal line sent already but not received by the main controller B21.

Furthermore, after new identification technologies such as non-contact card reader (e.g. Radio Frequency Identification [RFID] or Near Field Communication [NFC] card reader) and smart card reader become more popular, those new non-magnetic card readers and the conventional magnetic card reader exist together in the market in parallel. However, the interfaces and transmission protocols of those new non-magnetic card readers have compatible issues with the conventional magnetic card reader and the conventional transaction terminal. The retailers usually need to make some hardware and/or software adjustments (such as upgrade or replacement) so that their transaction terminals can be compatible with both the conventional magnetic card reader and the new non-magnetic card readers. For example, in FIG. 1, a main controller (not shown) of the conventional transaction terminal A2 can only receive the signals from the magnetic card reader A1 in an unidirectional manner, which is not sufficient for the bidirectional-transmission requirements of the new non-magnetic card reader. Therefore, such transaction terminal usually needs a large scale of hardware upgrades. On the other hand, for those transaction terminals with main controllers capable of receiving the signals of the magnetic card reader A1 and give commands in a bidirectional manner, it is easier to connect with the new non-magnetic card readers, but still difficult connecting with both the conventional magnetic card reader and the new non-magnetic card readers without any hardware change.

Purchasing is not limited to a local area due to the popularity of no-shop sales; people can make purchases even if they are in a vehicle. However a consumer must take out a credit card and insert it in a card reader in order to make such a transaction while in a vehicle, which is very inconvenient for a consumer. The transaction process is complex and tedious to the extent of decreasing consumer purchase interest. In the meantime, the compatible issues between the conventional magnetic card reader and the new non-magnetic card reader are critical for the users.

SUMMARY OF THE INVENTION

To improve a transaction system and a card reading device thereof, simplifying the transaction process thereof and increase effectively the convenience of the user's purchasing transaction, a card reading device for a transaction system is provided. The card reading device for a transaction system includes: a first reader, adapted to read a contact card and output a first analog signal; a converting chip, adapted to convert the first analog signal to a first digital signal with a preset format; a second reader, adapted to read non-contact card and output a second analog signal; a converter module, adapted to converting the second analog signal to a second digital signal; and an integrator module, receiving the first digital signal, transmitting it to a transaction terminal, and receiving the second digital signal, converting it to a signal conforming to the preset format and transmitting it to the transaction terminal.

In an embodiment, a card reading device for a transaction system includes: a first reader, adapted to read a contact card and output a first analog signal; a converting chip, adapted to covert the first analog signal to a first digital signal with a preset format and transmit the first digital signal to a transaction terminal; a second reader, adapted to read non-contact card and output a second analog signal; a converter module, adapted to converting the second analog signal to a second digital signal; and an integrator module, receiving the second digital signal, converting it to a signal conforming to the preset format and transmitting it to the transaction terminal.

In an embodiment, a non-magnetic card reader is adapted to electrically connect with a magnetic card reader and a transaction terminal for selectively reading and identifying a magnetic card and a non-magnetic card. The magnetic card reader has a first connector outputting a magnetic card signal. The terminal has a terminal connector and a main controller. The first connector and the terminal connector are both compatible with a magnetic-card communication protocol. The non-magnetic card reader includes a second reading unit, a converting module, a second input connector, a second output connector and an integrator module. The second reading unit reads card data of the non-magnetic card. The converting module decodes the read card data of the non-magnetic card. The second input connector electrically connects with the first connector of the magnetic card reader. The second output connector electrically connects with the terminal connector of the transaction terminal. The integrator module transceives the magnetic card signal from the second input connector to the second output connector, and converts the decoded card data of the non-magnetic card into a non-magnetic card signal; wherein the non-magnetic card signal is transmitted to the main controller of the transaction terminal for identification through the second output connector and the terminal connector; wherein the magnetic card signal is transmitted to the main controller of the transaction terminal for identification through the first connector of the magnetic card reader, the second input connector, the integrator module, the second output connector and the terminal connector.

In another embodiment, the magnetic card signal and the non-magnetic card signal are both compatible with the magnetic-card communication protocol. In another embodiment, the second input connector and the second output connector are compatible with the magnetic-card communication protocol. In another embodiment, the integrator module includes an interconnecting interface electrically connected with the converting module, an integrated input interface electrically connected with the second input connector, and an integrated output interface electrically connected with the second output connector. In another embodiment, the converting module has a converting interface electrically connecting with the interconnecting interface of the integrator module. In another embodiment, the converting interface of the converting module and the interconnecting interface of the integrator module are both compatible with a common format. In another embodiment, the common format is selected from a group consisting of USB (Universal Serial Bus), RS232 (Recommended Standard 232) and SPI (Serial Peripheral Interface). In another embodiment, the main controller of the transaction terminal is adapted for bidirectional communication through the terminal connector. In another embodiment, the magnetic card reader further includes a first reading unit and a converting chip, the converting chip converting card data of the magnetic card read from the first reading unit and outputting the magnetic card signal.

In another embodiment, a card transaction method includes the following steps: providing a magnetic card reader with a first connector, the magnetic card reader reading and decoding the card data of a magnetic card, and outputting a magnetic card signal through the first connector; providing a non-magnetic card reader, the non-magnetic card reader having a second input connector, an integrator module and a second output connector, the non-magnetic card reader reading and decoding the card data of a non-magnetic card, converting and outputting a non-magnetic card signal through the second output connector; electrically connecting the first connector of the magnetic card reader with the second input connector of the non-magnetic card reader; providing a transaction terminal with a main controller and a terminal connector, the terminal connector electrically connecting the second output connector to selectively receive the magnetic card signal and the non-magnetic card signal; transmitting the magnetic card signal to the main controller of the transaction terminal for transaction identification through the first connector, the second input connector, the integrator module, the second output connector and the terminal connector; and transmitting non-magnetic card signal from the integrator module to the main controller of the transaction terminal for transaction identification through the second output connector and the terminal connector.

In another embodiment, the magnetic card signal and the non-magnetic card signal are both compatible with a magnetic-card communication protocol. In another embodiment, the first connector of the magnetic card reader, the second input connector and the second output connector of the non-magnetic card reader, and the terminal connector of the transaction terminal are all compatible with the magnetic-card communication protocol. In another embodiment, the non-magnetic card reader further includes a second reading unit and a converting module, the card data of the non-magnetic card being read by the second reading unit, decoded by the converting module and converted by the integrator module into the non-magnetic card signal that is compatible with the magnetic-card communication protocol. In another embodiment, the magnetic card reader further includes a first reading unit and a converting chip, the card data of the magnetic card being read by the first reading unit of the magnetic card reader, decoded by the converting chip and outputting as the magnetic card signal through the first connector, the second input connector to the integrator module, the integrator module transceiving the magnetic card signal through the second output connector and the terminal connector to the main controller of the transaction terminal.

In another embodiment, a magnetic card reader is adapted to electrically connect with a transaction terminal for reading and identifying a magnetic card. The transaction terminal has a terminal connector and a main controller adapted for bidirectional communication through the terminal connector. The magnetic card reader includes a first reading unit, a converting chip and a first connector. The first reading unit has one or more sensing subunit to read card data of the magnetic card. The converting chip has one or more decode circuit, one or more buffer memory and an interface circuit. The decode circuit decodes the read card data of the magnetic card and stores into the buffer memory. The interface circuit has a first connecting interface with four signal input/output points to selectively output a magnetic card signal to the main controller of the transaction terminal and receive a command signal from the main controller of the transaction terminal. The first connector electrically connects with the first connecting interface of the interface circuit and with the terminal connector of the transaction terminal.

In another embodiment, when the read card data is decoded and stored into the buffer memory, the interface circuit transmits a notice signal to inform the main controller of the transaction terminal that the card data is available in the buffer memory. In another embodiment, the magnetic card reader further includes a clock signal line, a data output signal line, a data input signal line and a buffer notice signal line respectively connecting the four signal input/output points of the first connecting interface to the first connector. In another embodiment, a pulse is initiated on the clock signal line by the main controller of the transaction terminal so that the decoded card data stored in the buffer memory is transmitted to the main controller accordingly. In another embodiment, the magnetic card reader further comprises a clock signal line, a data output signal line, a data input signal line and a buffer notice signal line respectively connecting the four signal input/output points of the first connecting interface, wherein the clock signal line and the buffer notice signal line also directly connect to the first connector respectively, the data output signal line and the data input signal line connecting together as one to jointly connect with the first connector. In another embodiment, the command signal is transmitted through the data input signal line during a raising clocking edge of the timing on the clock signal line, and the magnetic card signal is transmitted through the data output signal line during a recessing clocking edge of the timing on the clock signal line.

The present invention can read a contact card and a non-contact card simultaneously, convert a read analog signal to a digital signal with the same preset format, and then transmit it to a transaction terminal to carry out a transaction so that a user may chose the use of a contact card or a non-contact card freely and complete the whole transaction easily during a purchasing, thereby simplifying the transaction flow of a user's purchase and increasing purchasing convenience.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 2:
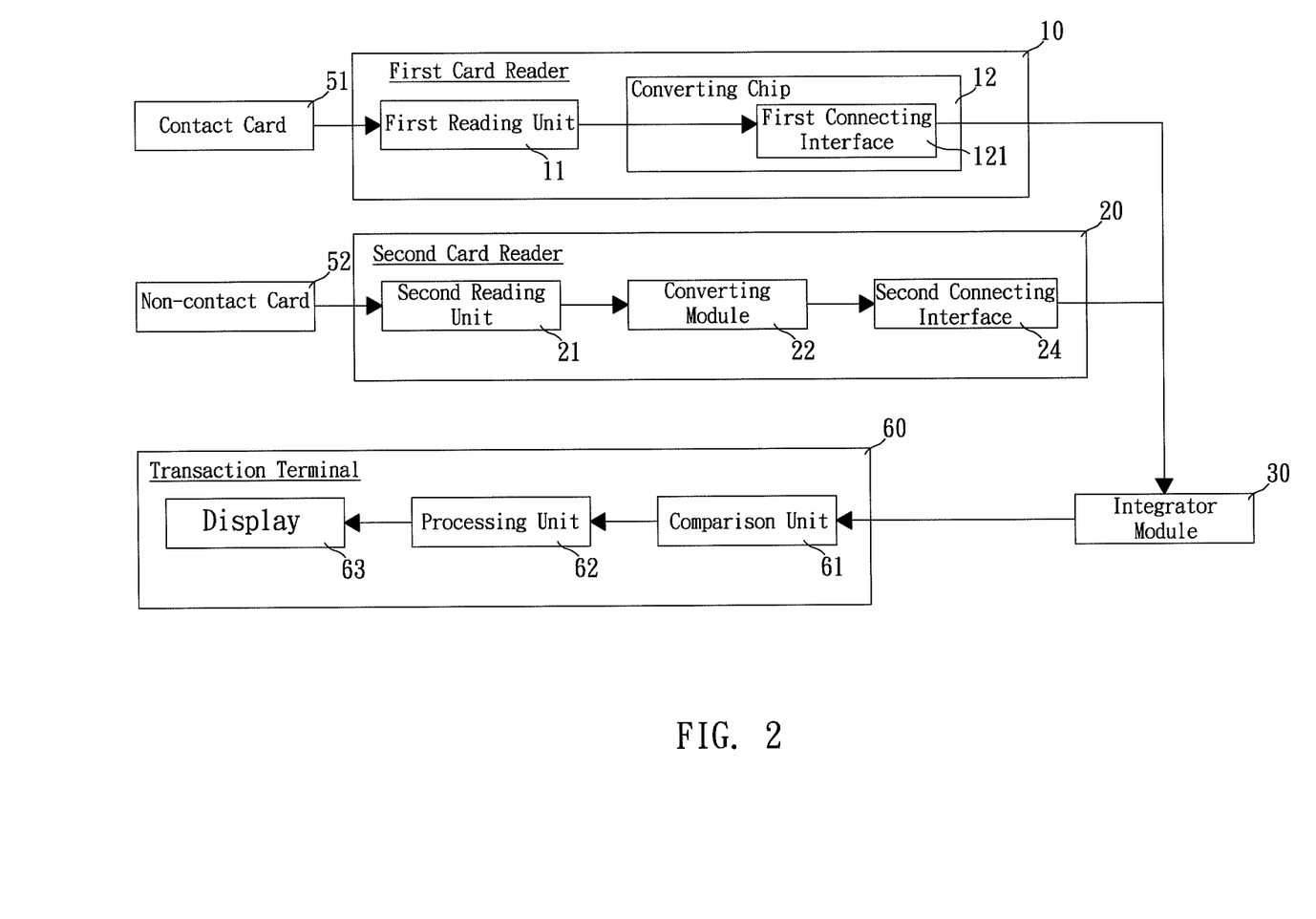
FIG. 2 is a block diagram, showing hardware of an embodiment according to the present invention.

Please refer to FIG. 2. FIG. 2 shows a first embodiment according to the present invention:

A card reading device for a transaction system according to the present invention includes a first card reader 10, a second card reader 20, an integrator module 30, and a transaction terminal 60.

The first reader 10 is configured with a first reading unit 11 and a converting chip 12; the first reading unit 11 is adapted to read a contact card 51, output a first analog signal, and convert the first analog signal to a first digital signal with a preset format through the converting chip 12. In addition, the converting chip 12 may be inbuilt with a first connecting interface 121, but it is not limited to this according to the present invention.

The second card reader 20 is configured with a second reading unit 21, a converter module 22 and a second connecting interface 24; the second reading unit 21 is adapted to read a non-contact card 52, output a second analog signal, and convert the second analog signal to a second digital signal through the converter module 22. Furthermore, the second connecter interface 24 may be selected from a group constituted by RS 232 interface, USB-OTG interface, IEEE 1394 standard interface and PCMCIA standard interface, where the second connecter interface 24 may preferably be a RS 232 interface, but it is not limited to this according to the present invention.

The integrator module 30 is respectively connected to the first connecting interface 121 and the second connecting interface 24; it is adapted to receive the first digital signal and the second digital signal, and can convert the second digital signal to a signal conforming to the preset format after receiving the second digital signal, enabling both the first digital signal and the second digital signal to be formatted with the same preset format.

The aforementioned contact card 51 has a magnetic strip or contact chip, and it may be a cash card, bank card or credit card. The non-contact chip 52 may preferably be a radio frequency identification (RFID) chip and may also be a cash card, bank card or credit card, where the structures and the types of the contact card 51 and the non-contact card are only given as examples, but they are not limited to these according to the present invention; the first reading unit 11 and the second reading unit 21 may also be proper cards capable of reading depending on practical needs.

The transaction terminal 60 can receive the first digital signal or the second digital signal transmitted from the integrator module 30 and carry out a transaction depending on the first digital signal or the second digital signal received thereby, where the transaction terminal 60 may be a point of sale (POS) terminal, home computer system, bank automated teller machine (ATM) terminal, digital television, network facility or personal point of sale (POS) terminal, but it is not limited to these according to the present invention.

Furthermore, the transaction terminal 60 is disposed with a comparison unit 61, a processing unit 62 and a display 63, where the comparison unit 61 may compare the first digital signal or the second digital signal, and the processing unit 62 processes a transaction depending on the first digital signal or the second digital signal after the comparison. In addition, the structure of the transaction terminal 60 is only given as an example, and it is not limited to this according to the present invention and may be changed or adjusted depending on practical needs, for example, it may be added with a printer, bar-code reader and etc.

The following description will take the present invention being applied on a high speed rail train as an example for the purpose of explanation, but it is not limited to this; the present invention can be applied to a place such as a room with a security entrance guard system.

A user may check the type and the price of a merchandise through a shopping magazine or a television. They can then take out plastic money such as a bank card or a credit card to pay the price of a selected article if they want to buy it. The first reading unit 11 may be used to read the contact card 51 if the plastic money is the contact card 51; the first reading unit 11 reads the data of the card such as the card number, the card holder of the contact card 51, outputs the first analog signal, transmits the signal to the integrator module 30 after the first analog signal is converted to a first digital signal through the converting chip 12 and then transmits it to the transaction terminal 60 to carry out the transaction through the integrator module 30. The second reading unit 21 may be used to read the non-contact chip 52 if the plastic money is the non-contact chip 52; the second reading unit 21 reads the data of the card such as the card number and the card holder of the non-contact chip 52, outputs the second analog signal, converts the second analog signal to the second digital signal through the converter module 22, transmits the second digital signal to the integrator module 30. Thereafter, the integrator module 30 converts the second digital signal to a signal conforming to a preset format and then transmits it to the transaction terminal 60 to carry out the transaction.

After the transaction terminal 60 receives the first digital signal or the second digital signal, the comparison unit 61 is first used to compare the first digital signal or the second digital signal, the processing unit 62 carries out the transaction if the signal is correct, and the display 63 is used to display the result of the transaction.

Figure 3:
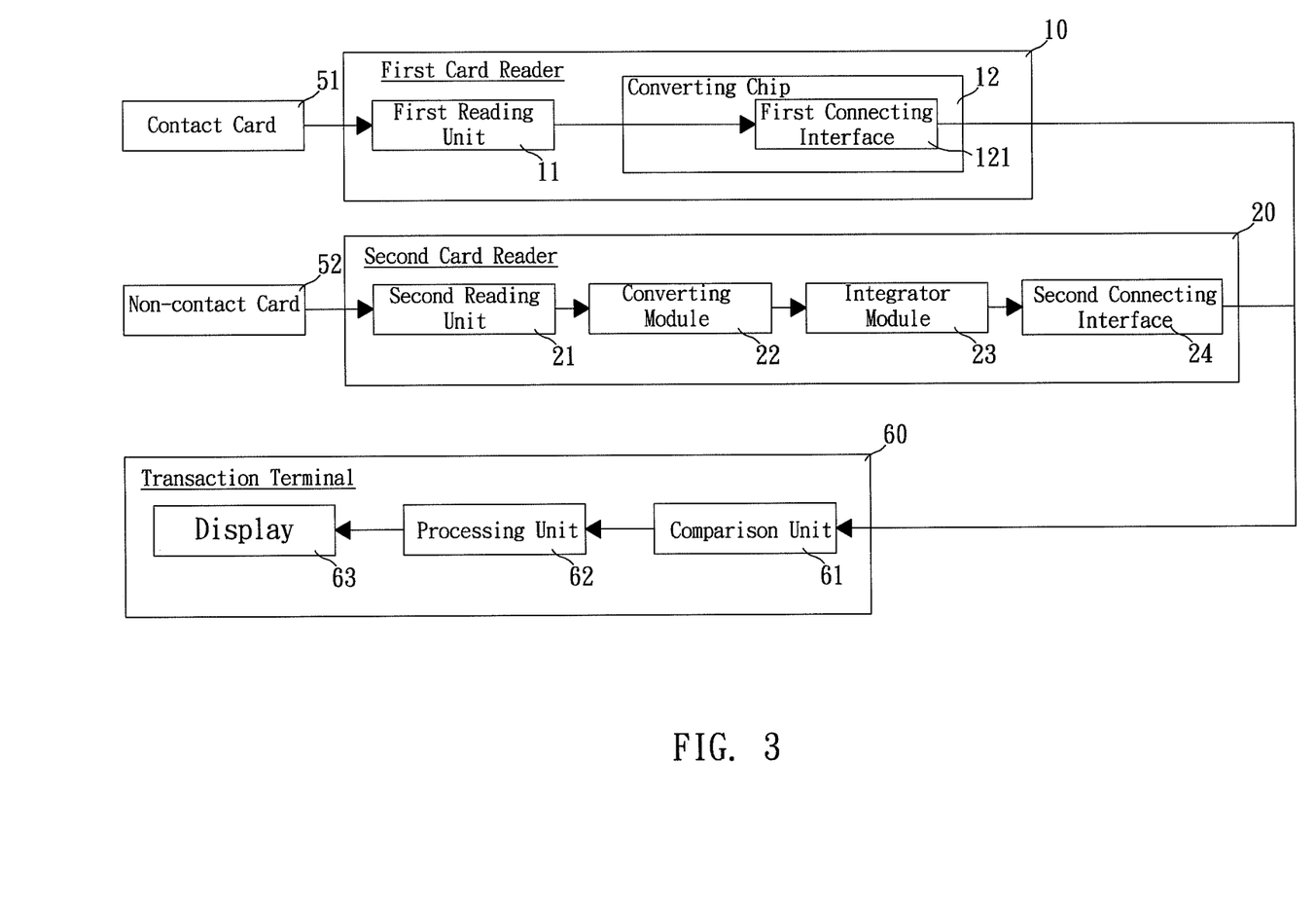
FIG. 3 is a block diagram, showing hardware of another embodiment according to the present invention.
Figure 4:
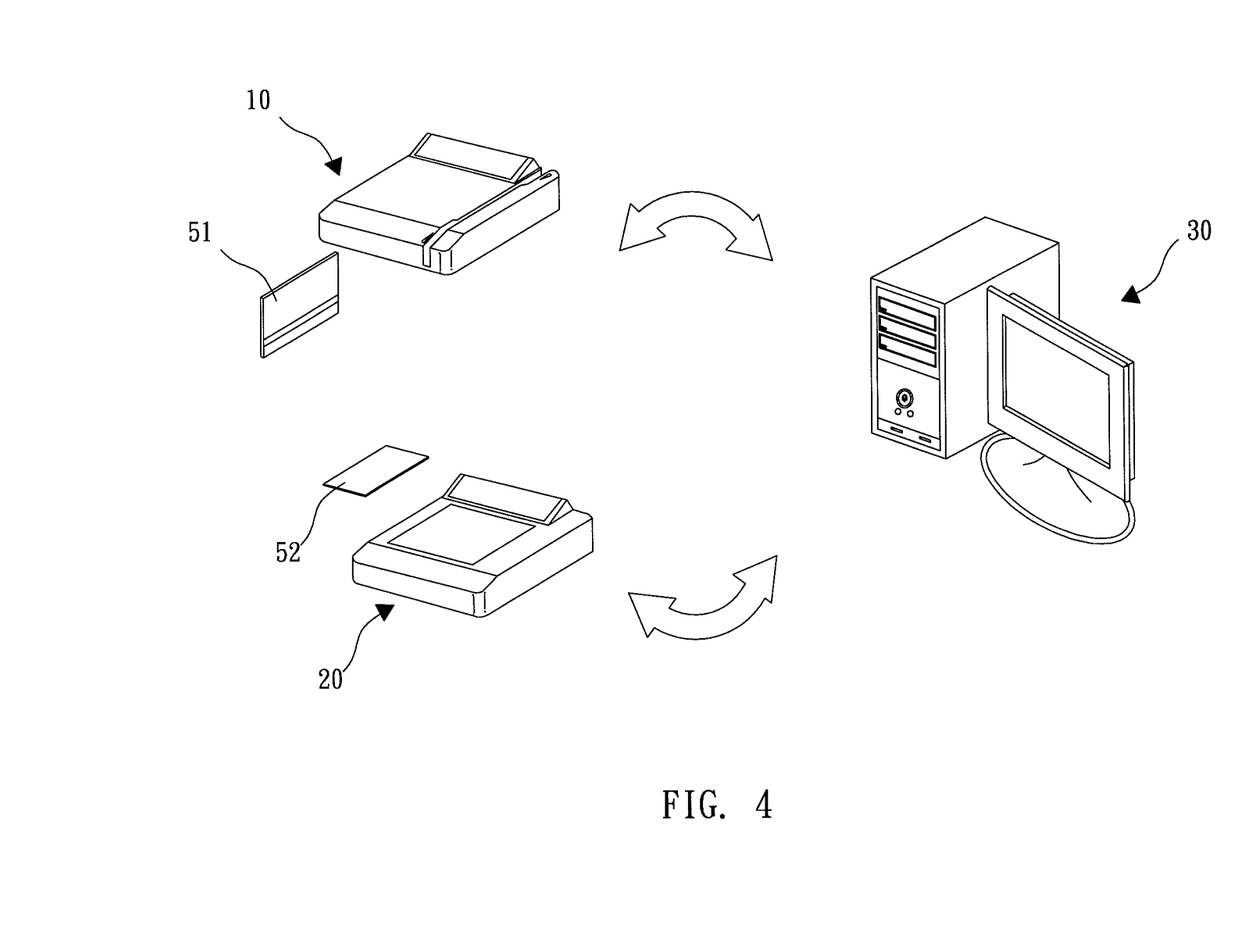
FIG. 4 is a schematic view of another embodiment according to the present invention.

Please refer to FIGS. 3 and 4. The figures illustrate a second embodiment according to the present invention.

In the present embodiment, the second card reader may further be disposed with an integrator module, a second analog signal is converted to a second digital signal after the second reading unit 21 reads the non-contact card 52 and outputs the second analog signal, and the integrator module 23 is then used to convert the second digital signal to a signal conforming to the preset format after it receives the second digital signal, allowing both the first digital signal and the second digital signal to be the same preset format, and the second digital signal can then be transmitted to the transaction terminal 60 through the second connecting interface 24. In addition, the first analog signal is converted to a signal with the preset format through the converting chip 12 after the first reading unit 11 reads the contact card 51 and outputs the first analog signal, and the first digital signal may then be transmitted to the transaction terminal 60 through the first connecting interface 121, The present invention uses a first reading unit to read a contact card and a second reading unit to read a non-contact card, converts a first analog signal or second analog signal to a first digital signal or second digital signal with the same preset format, and then transmits it to a transaction terminal to carry out a transaction. In this way, a user can complete the whole transaction easily no matter what kind of plastic money they use during purchasing (contact card or non-contact). In addition, the user only needs to put the non-contact card within a certain range of the second reading unit, and does not need to pass through complex and tedious card paying procedures if they use the non-contact card to carry out a transaction. Thus the transaction flow of a user's purchase can be simplified, and furthermore the purchasing convenience can be increased effectively. The preset format mentioned above may be a format compatible with a "magnetic-card communication protocol" between the transaction terminal and the first/second card reader respectively. The magnetic-card communication protocol includes but not limits to certain communication agreements when transmitting card data of a magnetic card, which regarding to relevant signal types, signal lines, message formats and communication mechanism for signal transmissions, physical connector types and pin definitions.

Figure 5:
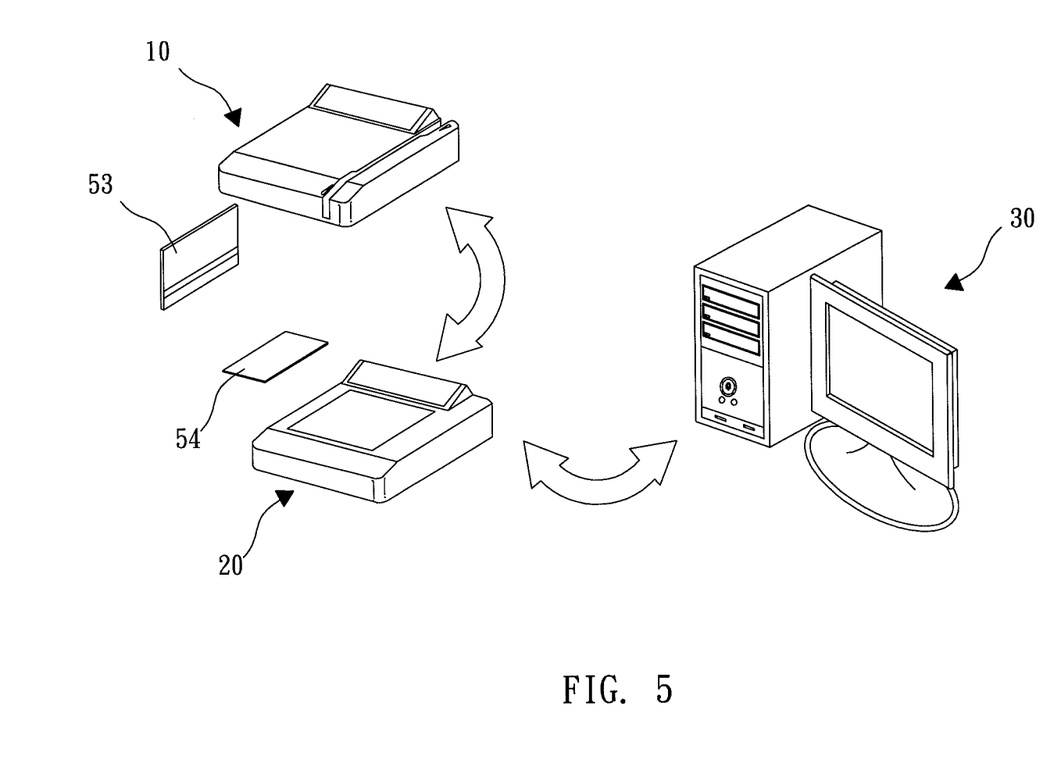
FIG. 5 is a physical explanatory view according to another embodiment of the present invention.
Figure 6:
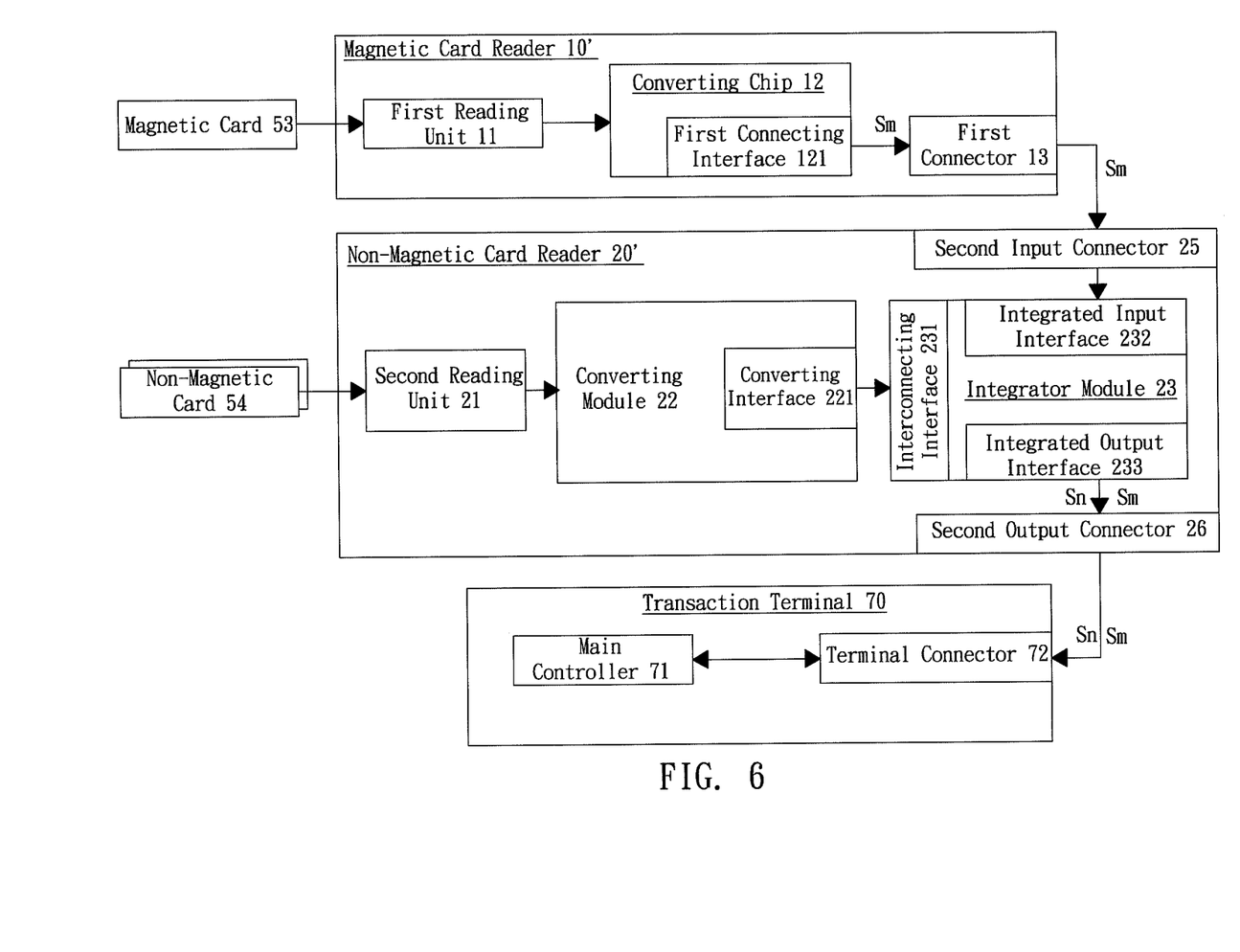
FIG. 6 is a block diagram showing hardware architecture of a transaction system for another embodiment according to the present invention.

Please refer to FIG. 5 and FIG. 6, which are respectively a physical explanatory diagram and a relevant block diagram according to another embodiment of the present invention. A transaction terminal 70 in FIG. 6, as an independent device separate from the magnetic card reader 10' and non-magnetic card reader 20', includes a main controller 71 and a terminal connector 72. The terminal connector 72 of the transaction terminal 70 is compatible with the magnetic-card communication protocol. And the main controller 71 is capable of bidirectional communication through the terminal connector 72.

Note that in FIG. 5, magnetic card reader 10' does not connected to the transaction terminal 70 directly; instead, the magnetic cared reader 10' is connected to the non-magnetic card reader 20' first. The non-magnetic card reader 20' connects to the transaction terminal 70 directly; both the magnetic card reader 10' and the non-magnetic card reader 20' may read different cards and send signals respectively to the transaction terminal 70 for identification of payment transaction.

Magnetic card reader 10' includes a first reading unit 11, a converting chip and a first connector. The first reading unit 11 senses and reads card information of a magnetic card 53 and then send analog signals to the converting chip 12. The converting chip 12 has a first connecting interface 121 electrically connecting with the first connector 13. Magnetic card signals Sm output from the first connecting interface 121 of the converting chip 12 are converted into a preset format compatible with the magnetic-card communication protocol. These magnetic card signals Sm will be further sent outwards through the first connector 13. In the embodiments of the present invention, the magnetic card signal Sm may include but not limited to any of the signals generated from the converting chip (e.g. the decoded magnetic card data in a signal format or the relevant signals when transmitting the decoded magnetic card data through an interface or multiple signal lines), or any combination of aforesaid signals.

Non-magnetic card reader 20' is an independent device separated from the magnetic card reader 10'. The term "non-magnetic" is a description of a card's identity that is not relevant with a magnetic strip to be read for identification of payment transaction. The term "non-magnetic card" means a card adapted for payment transaction yet WITHOUT a magnetic strip thereon to be read for identification; for example, a RFID card with a RFID tag thereon or, a smart card with an embedded information chip. Similarly, "non-magnetic card reader" means a card reader NOT adapted to read a magnetic card with a magnetic strip thereon. And "non-magnetic card signal" means a signal generated not relevant to a magnetic card with a magnetic strip.

The non-magnetic card reader 20' includes a second reading unit 21, a converting module 22, an integrator module 23, a second input connector 25 and a second output connector 26. The second reading unit 21 may be realized by various card reading mechanisms such as RFID-type or smart-card-type to read non-contact cards and smart cards, yet not including a magnetic reading head. The second reading unit 21 reads card information on the non-magnetic card 54. The converting module 22 has a converting interface 221. The converting module 22 decodes what the second reading unit 21 reads from the non-magnetic card 54 and output decoded signals through the converting interface 221. In an embodiment, the converting module 22 may also convert the decoded signals into a predetermined format such as USB (Universal Serial Bus), RS232 (Recommended Standard 232), SPI (Serial Peripheral Interface) and etc.

The integrator module 23 may be realized by various solutions such as a processor, an embedded circuit or an add-on circuit board. As shown in the drawing, the integrator module 23 includes an interconnecting interface 231, an integrated input interface 232 and an integrated output interface 233. According to different formats of non-magnetic card, the integrator module 23 correspondingly retrieves required information and converts to a preset format compatible with the magnetic-card communication protocol. For non-magnetic cards that have different formats such as ISO14443A, ISO14443B, ISO15693 or FeliCa formats, the converting module 22 will decode their card information into different digital formats. Then, according to different digital formats of non-magnetic cards, it is practical for the integrator module 23 to convert the decoded signals into "non-magnetic card signals" Sn with a preset format compatible with the magnetic-card communication protocol through corresponding signal converting technologies. In the embodiments of the present invention, the non-magnetic card signal Sn may include but not limited to, any of the signals generated from the integrated module but originally sent from the converting module of the non-magnetic card reader; for example, the decoded non-magnetic card data in a signal format converted and encoded to be compatible with the magnetic-card communication protocol, or the relevant signals when transmitting the converted signals through an interface or multiple signal lines, or any combination of aforesaid signals.

If necessary, the integrator module 23 may add or remove the information contents included in a communication message implied by the non-magnetic card signals Sn for the payment transaction process. For example, a general credit card uses only data of Track 1 (not shown) and Track 2 (not shown). The integrator module 23 may add information at Track 3 (not shown) to indicate if the card type is a contact card or a non-contact card. In addition, extra transaction information such as Terminal Verification Results, Transaction Type and Card CVM limit may be added in Track 3 and sent to the transaction terminal 70. Namely, aside from the information required for the magnetic-card communication protocol, the integrator module 23 is able to retrieve extra information read during the reading process of the second reading unit 21 and decoded by the converting module 22, then converts into non-magnetic card signal Sn (compatible with the magnetic-card communication protocol) and sends to the transaction terminal 70.

The second input connector 25 of the non-magnetic card reader 20' is electrically connected with the first connector 13 of the magnetic card reader 10' during operation of payment transaction. The magnetic card signals Sm can now be sent to the integrator module 23 through the first connector 13, the second input connector 25 and the integrated input interface 232. The magnetic card signals Sm do not necessarily need any further processing of the integrator module 23; yet it is possible for the integrator module 23 to add information in the communication message implied by the magnetic card signals Sm. The magnetic card signals Sm may be transceived to the main controller 71 of the transaction terminal 70 through the integrated output interface 233, the second output connector 26 and the terminal connector 72. To smoothly transmit the magnetic card signals Sm, the first connector 13 of the magnetic card reader 10', the second input/output connectors 25/26 of the non-magnetic card reader 20', the integrated input/output interfaces 232/233 of the integrator module 23, the terminal connector 72 of the transaction terminal 70 are all compatible with the magnetic-card communication protocol in signal transmission.

As to the non-magnetic card signals Sn, after the converting module 22 decodes what the second reading unit 21 reads from the non-magnetic card 54, the decoded signals is output from the converting interface 221 and the interconnecting interface 231 to the integrator module 23, thereby converting the decoded signals into the non-magnetic card signals Sn. Note that the converting interface 221 of the converting module 22 and the interconnecting interface are compatible with each other. Generally, the converting interface 221 and the interconnecting interface 231 are compatible with one of the common formats such as USB (Universal Serial Bus), RS232 (Recommended Standard 232), SPI (Serial Peripheral Interface) and etc. After the non-magnetic card signals Sn is converted, the integrator module 23 outputs the non-magnetic card signals Sn through the integrated output interface 233, the second output connector 26, and the terminal connector 72 to the main controller 71 of the transaction terminal 70 for identification process. Since both the non-magnetic card signals Sn and magnetic card signal Sm are compatible with the magnetic-card communication protocol, both types of signals may be transmitted through the integrated output interface 233, the second output connector 26, and the terminal connector 72 to the main controller 71.

With the non-magnetic card reader 20' disclosed above, if the retailer used to have a magnetic card reader, and a transaction terminal that has connector(s) compatible with magnetic-card communication protocol only, the upgrade cost is to acquire a non-magnetic card reader with an integrator module, as mentioned above, without changing the transaction terminal. Furthermore, for the transaction terminal 70 with the main controller 71 capable of bidirectional communications, it is possible for the transaction terminal 70 to send command signals back to the integrator module 23 and to the magnetic card reader 10' (command arrows not shown in FIG. 6) and resolve the technical problems in a conventional magnetic card reader if the magnetic card reader 10' is adapted as disclosed in the following embodiments.

In another embodiment, since the second reading unit 21 and the converting module 22 are enough to form a regular independent non-magnetic card reader, the integrator module 23 is possible to be redefined as an independent device separate from the magnetic card reader 10', the non-magnetic card reader 20' and the transaction terminal 70; only physical connector(s) is required between the converting module 22 and the separate integrator module 23. In such case, certainly, physical connector(s) is still required between the converting chip 12 of the magnetic card reader 10' and the separate integrator module 23.

Figure 7A:
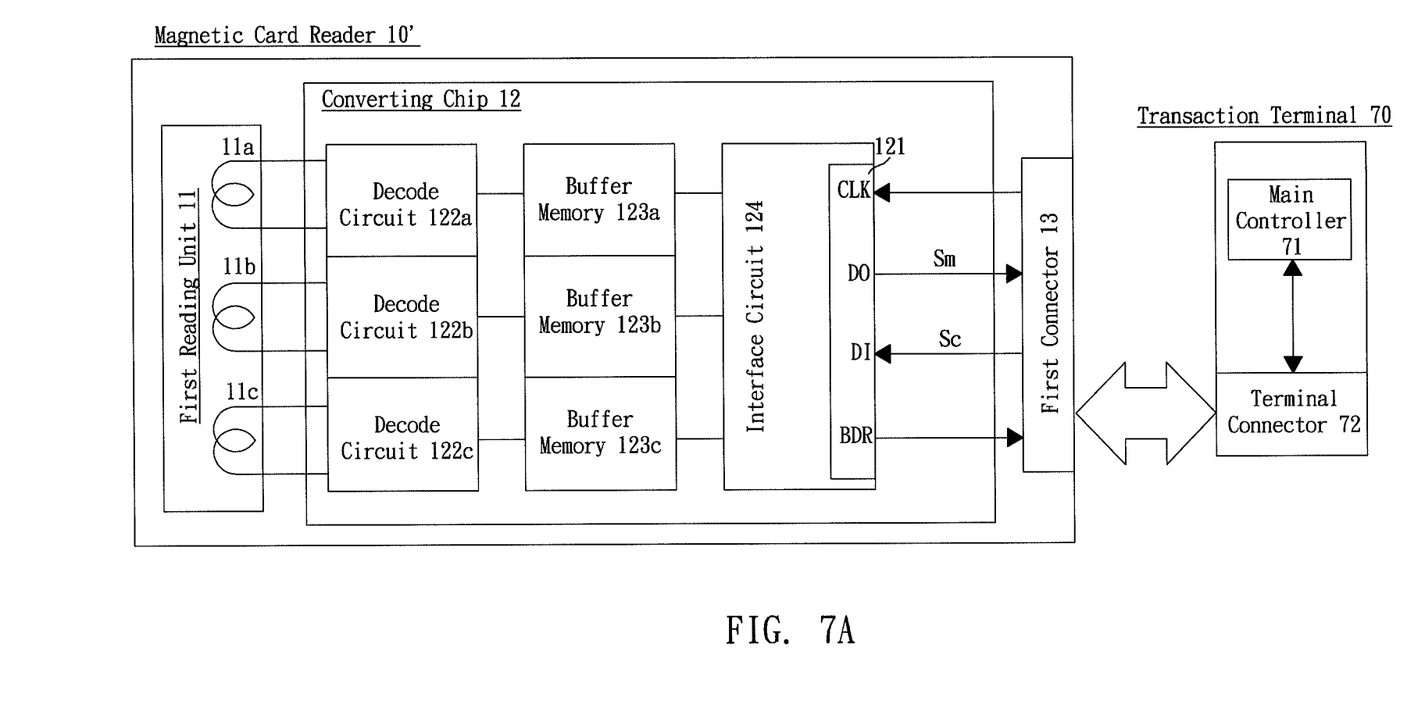
FIG. 7A is a block diagram showing hardware architecture of a magnetic card reader and a transaction terminal for another embodiment according to the present invention.

Please refer FIG. 7A, which is a block diagram of a magnetic card reader and a transaction terminal according to another embodiment of the present invention. Magnetic card reader 10' includes a first reading unit 11, a converting chip 12 and a first connector 13.

The first reading unit 11 includes several sensing subunits 11a/11b/11c to sense a magnetic card (not shown). Each of the sensing subunits 11a/11b/11c connects to the converting chip 12 and sends sensed signals to the converting chip 12.

The converting chip 12 includes several decode circuits 122a/122b/122c, several buffer memories 123a/123b/123c, an interface circuit 124, a first connecting interface 121 and signal lines CLK/DO/DI/BDR. Each of the decode circuits 122a/122b/122c correspondingly received the sensed signals respectively sent from the sensing subunits 11a/11b/11c of the first reading unit 11 and respectively decodes the sensed signals. The decoded sensed signals are sent to store as card data in the corresponding buffer memories 123a/123b/123c respectively. The stored card data may be accessed and retrieved by demand and be sent to the interface circuit 124.

The interface circuit 24 converts the stored card data into magnetic card signals with a preset format compatible with the magnetic-card communication protocol. The magnetic card signals are output through the first connecting interface 121 that includes four signal input/output points, each respectively connecting to the corresponding signal lines CLK/DO/DI/BDR between the converting chip 12 and the first connector 13. The clock signal line CLK allows clock signals sent from a clock generating source (not shown; could be the main controller 71 of the transaction terminal 70 or any other appropriate source) to the converting chip 12. The data output signal line DO allows the converting chip 12 to send out signals relevant to card information, or collectively called the magnetic card signals Sm. The data input signal line DI allows command signals Sc sent from the main controller 71 of the transaction terminal 70 or any other transaction systems. The buffer notice signal line BDR allows the converting chip 12 to send notice signals (or simply pull high/low) to the main controller 71 of the transaction terminal 70 and inform that card data is available in the buffer memories 123a/123b/123c.

When any sensed signal is generated from the sensing subunit 11a/11b/11c of the first reading unit 11, the decode circuits 122a/122b/122c starts to decode the corresponding sensed signals and store the decoded card data with (0, 1) format into the corresponding buffer memories 123a/123b/123c respectively. Afterwards, the buffer notice signal line BDR will be activated (change the voltage level or send an actual signal) to notice the main controller 71 of the transaction terminal 70 that card data is available in the buffer memories 123a/123b/123c. Since the decoded card data is stored in the buffer memories 123a/123b/123c, the main controller 71 would not need to instantly receive the data signals of card data. Moreover, the main controller 71 may initiate a pulse on the clock signal line CLK at any required timing, (and optionally also send a command signal Sc through the data input signal line DI), then the stored card data will be retrieved and processed by the interface circuit 124, and sent to the main controller 71 of the transaction terminal 70.

Unlike the conventional converting chip that can output card data but cannot receive commands, the converting chip 12 disclosed above is capable of outputting card data through the data output signal line DO and receiving commands through the data input signal line DI. Such converting chip 12 may perform more functions; for example, the parameter settings of the magnetic card reader may be modified by commands transmitted from the main controller of the transaction terminal to the converting chip.

If the transaction terminal is installed together with a magnetic card reader that has such converting chip, data transmission architecture of the main controller in the transaction terminal will be defined as bidirectional communication. Therefore, when any other card reader like non-contact card reader needs to be added as an additional input part for the transaction terminal, the integrator module may be connected between the transaction terminal and the magnetic card reader, while the integrated module may become a bridge between the added non-magnetic card reader and the transaction terminal. Since the added non-magnetic card reader is installed through current interface and communication format, the cost of upgrading the hardware/software installed in the transaction terminal may be greatly reduced.

Figure 7B:
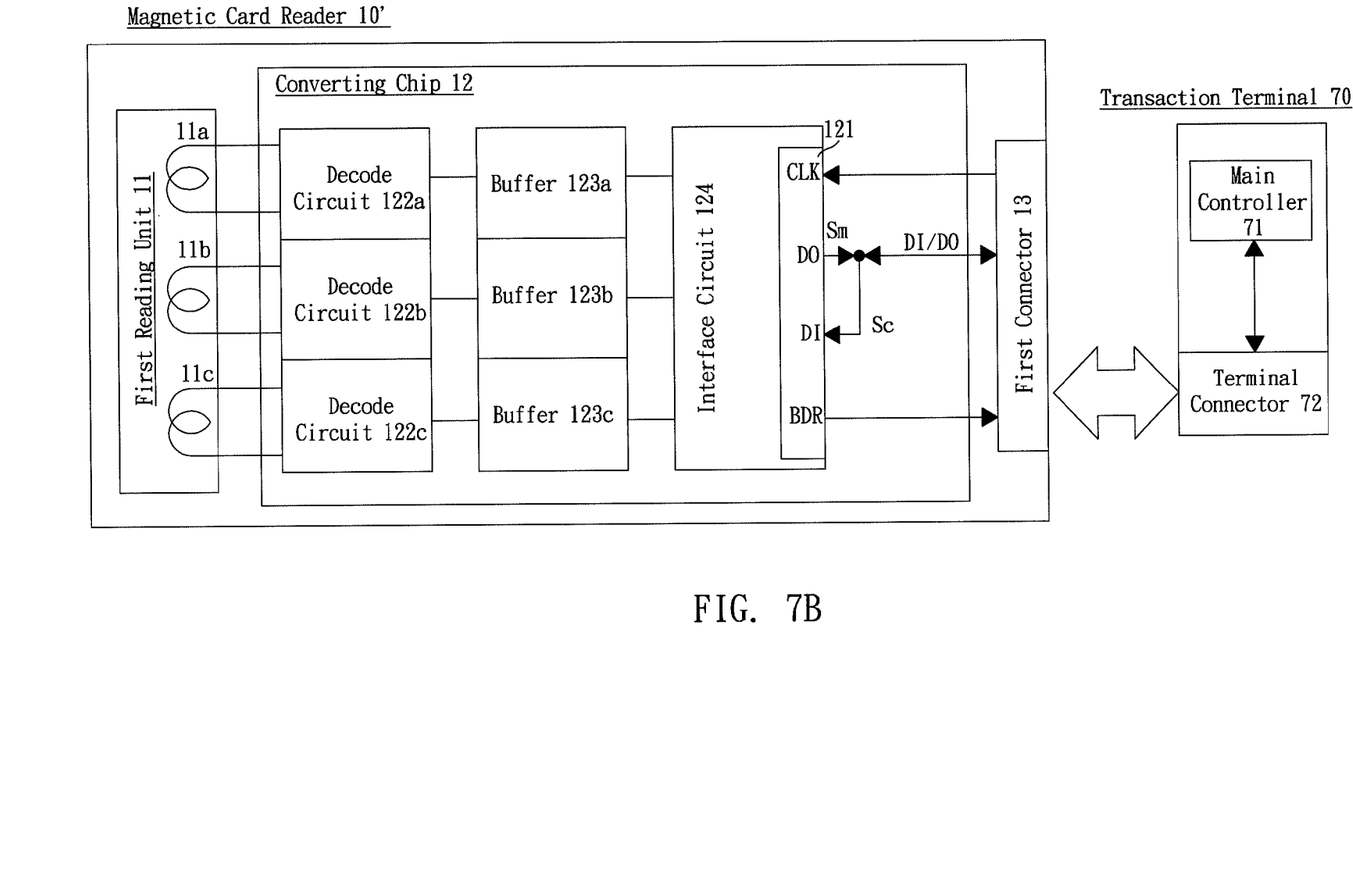
FIG. 7B is a block diagram showing hardware architecture of a magnetic card reader and a transaction terminal for another embodiment according to the present invention.

Please refer FIG. 7B, which is another block diagram of a magnetic card reader and a transaction terminal according to another embodiment of the present invention. The diagram is mostly the same like the magnetic card reader as shown in FIG. 7A. The major difference in FIG. 7B is that the data output signal line DO and the data input signal line DI are connected together as one signal line to jointly connect with the first connector 13. Such arrangement is adapted for three-pin applications. Wherever appropriate, the command signal Sc is transmitted through the data input signal line DI during a raising clocking edge of the timing on the clock signal line; and the magnetic card signal Sm is transmitted through the data output signal line DO during a recessing clocking edge of the timing on the clock signal line CLK. The raising clocking edge and the recessing clocking edge refers to two different types of sections on a timing diagram (not shown) of the clock signal line CLK.

In the aforesaid embodiments, a card transaction method is also disclosed. The card transaction method includes the following steps but not limited to the sequence of the steps:

Step A: Provide a magnetic card reader with a first connector. The magnetic card reader reads and decodes the card data of a magnetic card, and outputs a magnetic card signal through the first connector.

Step B: Provide a non-magnetic card reader. The non-magnetic card reader has a second input connector, an integrator module and a second output connector. The non-magnetic card reader reads and decodes the card data of a non-magnetic card, converts and outputs a non-magnetic card signal through the second output connector.

Step C: Electrically connect the first connector of the magnetic card reader with the second input connector of the non-magnetic card reader.

Step D: Provide a transaction terminal with a main controller and a terminal connector. The terminal connector electrically connects the second output connector to selectively receive the magnetic card signal and the non-magnetic card signal.

Step E: Transmit the magnetic card signal to the main controller of the transaction terminal for transaction identification through the first connector, the second input connector, the integrator module, the second output connector and the terminal connector.

Step F: Transmit the non-magnetic card signal from the integrator module to the main controller of the transaction terminal for transaction identification through the second output connector and the terminal connector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-magnetic card reader adapted to electrically connect with a magnetic card reader and a transaction terminal for selectively reading and identifying a magnetic card and a non-magnetic card, the magnetic card reader having a first connector outputting a magnetic card signal, the transaction terminal having a terminal connector and a main controller, both the first connector and the terminal connector being compatible with a magnetic-card communication protocol, the non-magnetic card reader comprising:

a second reading unit, reading card data of the non-magnetic card;

a converting module, decoding the read card data of the non-magnetic card;

a second input connector, electrically connecting with the first connector of the magnetic card reader;

a second output connector, electrically connecting with the terminal connector of the transaction terminal; and an integrator module, transceiving the magnetic card signal from the second input connector to the second output connector, and converting the decoded card data of the non-magnetic card into a non-magnetic card signal;

wherein the non-magnetic card signal is transmitted through the second output connector and the terminal connector to the main controller of the transaction terminal for identification;

wherein the magnetic card signal is transmitted through the first connector of the magnetic card reader, the second input connector, the integrator module, the second output connector and the terminal connector to the main controller of the transaction terminal for identification.

2. The non-magnetic card reader of claim 1, wherein the magnetic card signal and the non-magnetic card signal are both compatible with the magnetic-card communication protocol.

3. The non-magnetic card reader of claim 1, wherein the second input connector and the second output connector are compatible with the magnetic-card communication protocol.

4. The non-magnetic card reader of claim 1, wherein the integrator module comprises:

an interconnecting interface electrically connected with the converting module;

an integrated input interface electrically connected with the second input connector; and an integrated output interface electrically connected with the second output connector.

5. The non-magnetic card reader of claim 4, wherein the converting module has a converting interface electrically connecting with the interconnecting interface of the integrator module.

6. The non-magnetic card reader of claim 4, wherein the converting interface of the converting module and the interconnecting interface of the integrator module are both compatible with a common format selected from a group consisting of USB (Universal Serial Bus), RS232 (Recommended Standard 232) and SPI (Serial Peripheral Interface).

7. The non-magnetic card reader of claim 1, wherein the main controller of the transaction terminal is adapted for bidirectional communication through the terminal connector.

8. The non-magnetic card reader of claim 1, wherein the magnetic card reader further comprises a first reading unit and a converting chip, the converting chip converting card data of the magnetic card read from the first reading unit and outputting the magnetic card signal.

9. A card transaction method, comprising the steps of:

providing a magnetic card reader with a first connector, the magnetic card reader reading and decoding card data of a magnetic card, and outputting a magnetic card signal through the first connector;

providing a non-magnetic card reader, the non-magnetic card reader having a second input connector, an integrator module and a second output connector, the non-magnetic card reader reading and decoding the card data of a non-magnetic card, converting and outputting a non-magnetic card signal through the second output connector;

electrically connecting the first connector of the magnetic card reader with the second input connector of the non-magnetic card reader;

providing a transaction terminal with a main controller and a terminal connector, the terminal connector electrically connecting the second output connector to selectively receive the magnetic card signal and the non-magnetic card signal;

transmitting the magnetic card signal to the main controller of the transaction terminal for transaction identification through the first connector, the second input connector, the integrator module, the second output connector and the terminal connector; and transmitting the non-magnetic card signal from the integrator module to the main controller of the transaction terminal for transaction identification through the second output connector and the terminal connector.

10. The card transaction method of claim 9, wherein the magnetic card signal and the non-magnetic card signal are both compatible with a magnetic-card communication protocol.

11. The card transaction method of claim 10, wherein the first connector of the magnetic card reader, the second input connector and the second output connector of the non-magnetic card reader, and the terminal connector of the transaction terminal are all compatible with the magnetic-card communication protocol.

12. The card transaction method of claim 10, wherein the non-magnetic card reader further comprises a second reading unit and a converting module, the card data of the non-magnetic card that is read by the second reading unit, decoded by the converting module and converted by the integrator module into the non-magnetic card signal, is compatible with the magnetic-card communication protocol.

13. The card transaction method of claim 10, wherein the magnetic card reader further comprises a first reading unit and a converting chip, the card data of the magnetic card being read by the first reading unit of the magnetic card reader, being decoded by the converting chip and output as the magnetic card signal through the first connector, the second input connector to the integrator module, the integrator module transceiving the magnetic card signal through the second output connector and the terminal connector to the main controller of the transaction terminal.

* * * * *